United States Patent
Ariyoshi et al.

(10) Patent No.: US 6,956,630 B2
(45) Date of Patent: Oct. 18, 2005

(54) REFLECTION TYPE LIQUID-CRYSTAL DISPLAY APPARATUS

(75) Inventors: Toshihiko Ariyoshi, Osaka (JP); Hideo Abe, Osaka (JP); Seiji Umemoto, Osaka (JP)

(73) Assignee: Nitto Denko Corporation, Osaka (JP)

( * ) Notice: Subject to any disclaimer, the term of this patent is extended or adjusted under 35 U.S.C. 154(b) by 162 days.

(21) Appl. No.: 10/092,449

(22) Filed: Mar. 8, 2002

(65) Prior Publication Data

US 2002/0180908 A1 Dec. 5, 2002

(30) Foreign Application Priority Data

Mar. 9, 2001 (JP) .................................... P2001-066652

(51) Int. Cl.⁷ .......................................... G02F 1/1335
(52) U.S. Cl. ....................................................... 349/63
(58) Field of Search ........................... 349/61–65, 158, 349/113, 67, 173, 160–165

(56) References Cited

U.S. PATENT DOCUMENTS

| | | | |
|---|---|---|---|
| 4,610,510 A | * 9/1986 | Funada et al. | 349/187 |
| 5,029,045 A | * 7/1991 | Sanai et al. | 362/26 |
| 5,581,380 A | 12/1996 | Bergman | |
| 5,764,322 A | * 6/1998 | Mamiya et al. | 349/65 |
| 5,886,759 A | * 3/1999 | Mashino et al. | 349/65 |
| 6,266,108 B1 | * 7/2001 | Bao et al. | 349/63 |
| 6,603,519 B2 | * 8/2003 | Fukiharu | 349/63 |
| 6,712,482 B2 | * 3/2004 | Kawakami et al. | 362/31 |

FOREIGN PATENT DOCUMENTS

| | | |
|---|---|---|
| EP | 1 063 561 A | 12/2000 |
| JP | 8-94844 | 4/1996 |

OTHER PUBLICATIONS

Patent Abstracts of Japan, vol. 1999, No. 05, May 31, 1999 & JP 11 053918 A (Seiko Epson Corp), Feb. 26, 1999 *abstract*.

Patent Abstracts of Japan, vol. 2000, No. 03, Mar. 30, 2000 & JP 11 353922 A (Advanced Display Inc), Dec. 24, 1999 *abstract*.

Patent Abstracts of Japan, vol. 2000, No. 16, May 8, 2001 & JP 2001 014923 A (Seiko Epson Corp), Jan. 19, 2001 *abstract*.

\* cited by examiner

*Primary Examiner*—Tarifur R. Chowdhury
*Assistant Examiner*—Richard Kim
(74) *Attorney, Agent, or Firm*—Sughrue Mion, PLLC

(57) ABSTRACT

A reflection type liquid-crystal display apparatus has a light source; and a liquid-crystal display device including a lower substrate provided with a reflection plate, an upper substrate provided with a transparent film on which a light reflection element is provided for reflecting transmitted light toward the lower substrate side, and liquid crystal held between the lower substrate and the upper substrate, the light source being disposed at an end surface of the upper substrate, the liquid-crystal display device being configured so that light incident onto a surface of the upper substrate opposite to a contact surface of the upper substrate with the liquid crystal is reflected by the reflection plate of the lower substrate so as to exit from the surface of the upper substrate opposite to the contact surface of the upper substrate with the liquid crystal, wherein at least one of end surfaces except the end surface on which the light source is disposed is coated with a reflection layer.

8 Claims, 1 Drawing Sheet

REFLECTION TYPE LIQUID-CRYSTAL DISPLAY APPARATUS

The present application is based on Japanese Patent Application No. 2000-066652, which is incorporated herein by reference.

BACKGROUND OF THE INVENTION

1. Field of the Invention

The present invention relates to a reflection type liquid-crystal display apparatus having a light source in the system in which light is led in from a direction of the thickness of the apparatus.

2. Description of the Related Art

Liquid-crystal display apparatuses (hereinafter also referred to as "LCDs") are used in desk-top electronic calculators, electronic clocks, personal computers, word processors, and so on. The demand for such liquid-crystal display apparatuses has increased rapidly in recent years. The applications of such LCDs have been widened. Hence, reduction in thickness and weight of a liquid-crystal display panel has been required with the recent popularization of a portable information apparatus such as a cellular phone, a PDA, or the like.

A reflection type liquid-crystal display apparatus having the advantage of low electric power consumption is widely used as a portable information terminal display. There is however a problem that display is hard to view in a dark place because the apparatus is of a reflection type using external light. To solve this problem, there is a proposal of a reflection type liquid-crystal display apparatus in which a light-reflecting element is provided on a film stuck onto a surface of a liquid-crystal panel so that illumination light incident on an end surface of the liquid-crystal panel is reflected toward the panel side by the light-reflecting element to thereby perform illumination.

In such a reflection type liquid-crystal display apparatus, however, a part of light incident on one end surface of the liquid-crystal panel exits from the other end surface of the panel directly, so that it is impossible to use the incident light efficiently. There is a problem that the illuminating effect is insufficient.

SUMMARY OF THE INVENTION

An object of the invention is to provide a reflection type liquid-crystal display apparatus having a high illuminating effect to solve the problem in the related art.

The invention makes a proposal of solving the problem, that is, a proposal of reducing the loss of incident light in a reflection type liquid-crystal display apparatus in which a light-reflecting element is provided on a film stuck onto a surface of substrates (liquid-crystal panel) constituting a liquid-crystal cell so that illumination light incident on an end surface of the substrates is reflected toward the substrate side by the light-reflecting element to thereby perform illumination.

That is, according to the invention, there is provided a reflection type liquid-crystal display apparatus having: a light source; and a liquid-crystal display device including a lower substrate provided with a reflection plate, an upper substrate provided with a transparent film on which a light reflection element is provided for reflecting transmitted light toward the lower substrate side, and liquid crystal held between the lower substrate and the upper substrate, the light source being disposed at an end surface of the upper substrate, the liquid-crystal display device being configured so that light incident onto the upper substrate opposite to a contact surface of the upper substrate with the liquid crystal is reflected by the reflection plate of the lower substrate so as to exit from the surface of the upper substrate opposite to the contact surface of the upper substrate with the liquid crystal, wherein at least one of end surfaces except the end surface on which the light source is disposed is coated with a reflection layer.

In the liquid-crystal display apparatus according to the invention, preferably, the reflection layer is constituted by a selected one of a reflection film, a reflection sheet and a reflection plate stuck onto at least one of all the end surfaces except the end surface on which the light source is disposed.

In the liquid-crystal display apparatus according to the invention, preferably, an end portion of the upper substrate is protuded more than a corresponding end portion of the lower substrate so the light source is disposed on the end surface of the upper substrate in order to mount the light source easily and prevent light leakage.

Next, in the reflection type liquid-crystal display apparatus according to the invention, preferably, the reflection layer is provided on an inner surface of a frame so that at least one end surface of the liquid-crystal display device is disposed closely on the frame.

Further, in the reflection type liquid-crystal display apparatus according to the invention, preferably, a selected one of a reflection film, a reflection sheet and a reflection plate is stuck onto the inner surface of the frame.

Further, in the reflection type liquid-crystal display apparatus according to the invention, preferably, the inner surface of the frame is made of a metal plate having a light-reflecting function.

Further, in the reflection type liquid-crystal display apparatus according to the invention, preferably, a polarizer is disposed on the surface of the upper substrate opposite to the contact surface of the upper substrate with the liquid crystal.

Features and advantages of the invention will be evident from the following detailed description of the preferred embodiments described in conjunction with the attached drawings.

DETAILED DESCRIPTION OF THE PREFERRED EMBODIMENTS

Figure 1:
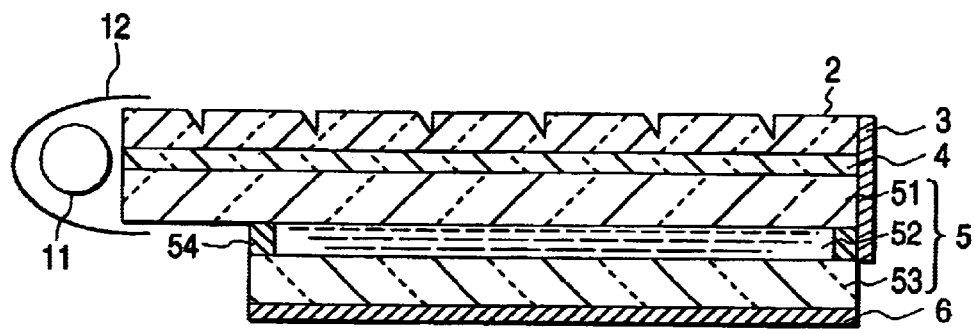
FIG. 1 is a vertical sectional view of a reflection type liquid-crystal display apparatus showing a first embodiment of the invention.

A mode for carrying out the invention will be described below with reference to the drawings. FIG. 1 is a vertical sectional view of a reflection type liquid-crystal display apparatus showing a first embodiment of the invention.

A reflection plate 6 is provided on the lower surface of a lower substrate 53. A lower transparent electrode is provided on the upper surface of the lower substrate 53. The lower transparent electrode is not shown in FIG. 1.

An upper transparent electrode is formed on the lower surface of an upper transparent substrate 51. TN liquid crystal 52 is confined in a region which is formed between the lower and upper transparent electrodes opposite to each other and which is surrounded by a seal 54. Although FIG. 1 shows the case where the seal 54 is provided in two sides between the lower substrate 53 and the upper transparent substrate 51, the seal 54 is practically provided in four sides so as to prevent the TN liquid crystal 52 from leaking. Incidentally, the upper transparent electrode is not shown in FIG. 1.

A polarizer 4 and a light guide film 2 are provided successively on the upper transparent substrate 51 through adhesive layers.

An illuminator includes alight source 11, and a reflection sheet (reflector) 12. The light source 11 is disposed along a side end surface of the upper transparent substrate 51 so that illumination light is made incident on the side end surface of the upper transparent substrate 51. The reflection sheet 12 is disposed to envelop the light source 11 so that light generated by the light source 11 can enter the upper transparent substrate 51 efficiently. The end portion of the upper transparent substrate 51 on which illumination light is incident is protruded more than a corresponding end portion of the lower substrate 53 to thereby form a protruded end portion. The light source 11 is disposed along the protruded end portion. Opposite end portions of the reflection sheet 12 disposed so as to cover the light source 11 are attached closely to upper and lower surfaces in the protruded end portion of the upper transparent substrate 51 to thereby prevent light leakage.

A reflection sheet 3 is stuck, through an adhesive agent, onto at least one, preferably three of all end surfaces except the end surface on which the light source 11 is disposed, so that the end surface(s) is (are) covered with the reflection sheet 3.

In the invention, a light-reflecting mechanism is provided on at least one of all the end surfaces of the upper substrate except the end surface on which the light source is provided. Hence, light incident on an end surface of the panel is reflected toward the panel side by a light-reflecting element provided on the other end surface, so that the reflected light enters the panel again. Accordingly, light leakage can be prevented, so that the efficiency of utilizing light entering the liquid-crystal panel can be improved. Also in the case where the light reflection mechanism is combined with GH liquid crystal as well as TN liquid crystal, image display with good contrast both in a lighting mode and in a non-lighting mode can be achieved.

Figure 2:
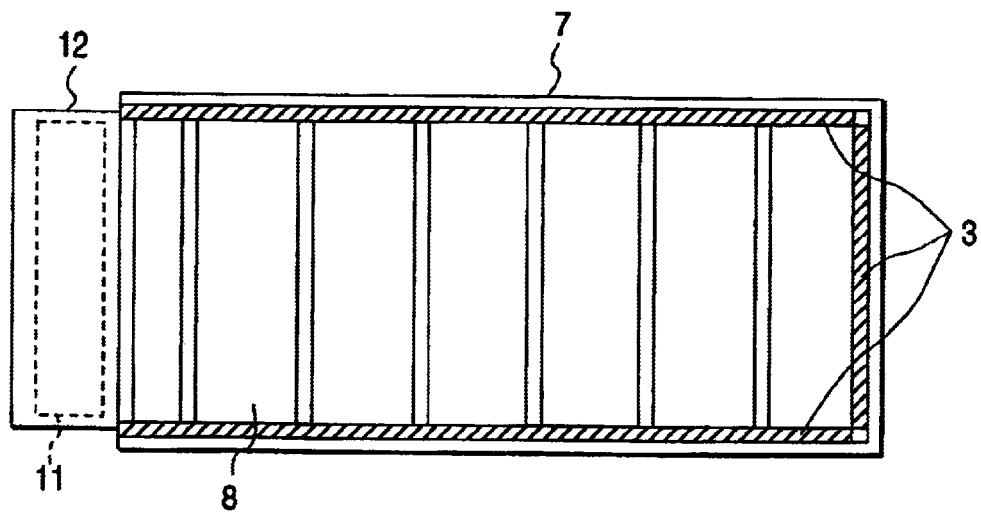
FIG. 2 is a plan view of the reflection type liquid-crystal display apparatus showing a second embodiment of the invention.

FIG. 2 is a plan view showing a second embodiment of the invention. A frame 7 is made of a metal or the like so that the frame 7 has such a size that a liquid-crystal display device can be disposed closely. A reflection sheet 3 is stuck to an inner surface of the frame 7 through an adhesive agent. The liquid-crystal display device 8 is inserted in the frame 7 in such a direction that the light source 11 is protruded more than the frame 7. The liquid-crystal display device 8 is fixed by a transparent adhesive agent, or a transparent adhesive agent. Incidentally, the liquid-crystal display device 8 is produced in the same manner as in the first embodiment except that the reflection sheet is not stuck to end portions of the upper substrate.

Also in the case where the reflection layer is provided on the inner surface of the frame as described in this embodiment, light leakage can be prevented by the same function as in the first embodiment so that the efficiency of utilizing light incident on the liquid-crystal panel can be improved because end surfaces of the liquid-crystal display device are disposed close to the frame.

The invention will be described below in detail. In the first embodiment of the invention, the reflection layer may be provided on at least one of all the end surfaces except the end surface on which the light source is disposed. Preferably, the reflection layer may be provided on three end surfaces in order to improve the illuminating effect.

The reflection layer as to the kind, material, etc. is not particularly limited but it is preferably made of a material which can be attached to side surfaces of the panel easily and which is high in reflectance. Examples of the material include a plastic film, a plastic sheet, and a metal plate piece each of which has a silver-sputtered layer, a silver vapor-deposited layer, or a high-reflectance ink layer. The film, the sheet, or the plate is stuck to end surfaces of the liquid-crystal panel through a transparent adhesive agent. The thickness of the film, the sheet or the plate forming the reflection layer is not particularly limited but is preferably selected to be in a range of from 100 to 500 μm from the point of view of treatment such as sticking.

In the second embodiment of the invention, a reflection layer is provided on an inner surface of a frame and a liquid-crystal panel is inserted in the frame so that the reflection layer is disposed close to end surfaces of the panel. Thus, a light-reflecting mechanism is formed. In this case, the used frame as to the structure and material is not particularly limited but a known material in the related art can be used suitably in accordance with the structure of the liquid-crystal panel which is a subject of insertion in the frame. For example, various kinds of resin plates and metal plates can be used. Especially, a material excellent in heat resistance and durability is preferred.

Examples of the method for forming the light-reflecting mechanism include: a method in which a material having a light-reflecting function, such as a steel plate plated with a metal such as tin, silver or aluminum or a plastic plate having a surface plated with a metal, is used as a frame; and a method in which a reflection layer made of a film, a sheet or a plate as used in a frame is stuck to the frame through a transparent adhesive agent.

In the case where the frame is to be made of a material having a light-reflecting function, the frame may be treated/used by use of a metal flat plate exhibiting a reflecting function in at least its inner surface, and it is unnecessary that all the inner surface of the frame has such a reflecting function. To improve the illuminating effect, the inner surface of the frame is preferably made of a material having a reflecting function.

Further, in the case where the light-reflecting sheet, film or plate is to be stuck to the frame, a plastic film or sheet or a metal plate having a silver-sputtered layer, a silver vapor-deposited layer, or a high-reflectance ink layer as described above is stuck to positions corresponding to end surfaces of the liquid-crystal panel, in the inner surface of the frame in which the liquid-crystal panel is inserted in advance. Then, the frame is bent by 90 degrees at three points so as to have a size slightly smaller than that of the liquid-crystal panel. Thus, the reflection type liquid-crystal display panel according to the invention can be obtained easily.

In the invention, the liquid-crystal display apparatus as to the kind is not particularly limited. For example, the liquid-crystal display device may be of any type such as an active matrix drive type using thin-film transistors or a passive matrix drive type. Specific examples of the type include: a twisted nematic (TN) system, a super-twisted nematic (STN) system, a vertical alignment (VA) system, an in-plane switching (IPS) system, a polymer dispersion liquid crystal (PDLC) system, a guest-host (GH) system, a ferroelectric liquid crystal (FLC) system, and an electrically controlled birefringence (ECB) system.

In practical use of the liquid-crystal display apparatus according to the invention, other optical layers (optical members) maybe used to be laminated on the liquid-crystal cell. The optical layers are not particularly limited. For example, there may be used one suitable optical layer or two or more suitable optical layers allowed to be used for forming the liquid-crystal display apparatus, such as a polarizer, a phase retarder (inclusive of a λ plate such as a half-wave plate or a quarter-wave plate) and a view angle compensating film.

The other optical members may be formed by a system of laminating them successively and individually in a process of production of the liquid-crystal display apparatus. Alternatively, the polarizer, the phase retarder, and so on maybe integrated with the liquid-crystal cell through adhesive layers in advance. The optical members laminated in advance as two layers or as three or more layers are excellent in stability of quality and efficiency of assembling. Hence, there is an advantage in that the efficiency of producing the liquid-crystal display apparatus can be improved. Incidentally, a suitable bonding material such as an adhesive agent can be used for the lamination.

A suitable material such as an acrylic-based adhesive agent, a silicone-based adhesive agent, a polyester-based adhesive agent, polyurethane-based adhesive agent, a polyether-based adhesive agent or a rubber-based adhesive agent maybe used as the adhesive agent. Especially, an acrylic-based adhesive agent is preferably used from the point of view of heat resistance, and optical characteristic.

An example of the polarizer is a polarizer in which a transparent protective film serving as a protective layer is laminated, through a suitable adhesive agent, on either or each of opposite sides of a polarizing element made of a dichromatic substance-containing polyvinyl alcohol-based polarizing film.

There is generally used a polarizer in which a transparent protective film made of a polymer film excellent in transparency, mechanical strength, heat stability, and moisture sealability is stuck to a polarizing element obtained by applying, in a suitable sequence and system, a dyeing process using iodine or dichromatic dye, an orienting process and a crosslinking process to a hydrophilic macromolecular film such as a polyvinyl alcohol film or a partially formalized polyvinyl alcohol film and drying the film. Examples of the polymer include:
polyester-based resin; acetate-based resin;
polynorbornene-based resin; polyether-sulfone-based resin;
polycarbonate-based resin; polyamide-based resin;
polyimide-based resin; polyolefin-based resin; acrylic-based resin; and heat-curable or ultraviolet-curable resin such as acrylic-based resin, urethane-based resin, epoxy-based resin, or silicon-based resin.

The phase retarder is used for changing linearly polarized light into elliptically or circularly polarized light or for changing elliptically or circularly polarized light into linearly polarized light, or for changing the direction of polarization of the linearly polarized light. Specific examples of the phase retarder include: a birefringent film obtained by orienting a film of a polymer such as polycarbonte, polyvinyl alcohol, polystyrene, polymethyl methacrylate, polypropylene, other polyolefins, polyallylate or polyamide; an alignment film of a liquid-crystal polymer; and an alignment layer of a liquid-crystal polymer supported by a film.

The view angle compensating film is a film for widening the view angle so that an image can be viewed relatively sharply even in the case where the screen of the liquid-crystal display apparatus is viewed not perpendicularly but obliquely with respect to the screen. A triacetyl cellulose film or the like coated with discotic liquid crystal or a phase retarder is used as the view angle compensating film.

The reflection layer is generally provided on the rear side of the liquid-crystal cell, so that, for example, a liquid-crystal display apparatus of the type in which incident light from the visual side (display side) is reflected and displayed can be formed. Hence, the necessity of providing a light source such as a backlight in the inside of the liquid-crystal display apparatus can be eliminated. Hence, there is an advantage in that reduction in thickness of the liquid-crystal display apparatus can be attained easily. A suitable layer according to the related art can be used as the reflection layer. Specific examples of the reflection layer include: a coating layer containing metal foil or metal powder in a binder; a reflection plate having the coating layer provided on a support substrate; a metal vapor-deposited layer; and a reflection plate having the metal vapor-deposited layer provided on a support substrate.

In addition, the layers such as optical layers and adhesive layers for forming the polarizer and optical members may be made to have ultraviolet absorptive power, for example, by a method of treating them with an ultraviolet absorptive agent such as a salicylic ester-based compound, a benzophenone-based compound, a benzotriazole-based compound, a cyanoacrylate-based compound, or a nickel complex salt-based compound.

The invention will be described below more specifically by way of example.

EXAMPLE 1

An ultraviolet-curable resin was applied onto a mold processed into a fine shape in advance. Then, an 80 μm-thick triacetyl cellulose film subjected to a surface-bonding treatment was disposed close to the ultraviolet-curable resin. After the resin was then exposed and cured by use of a metal halide lamp, a film having a finely treated surface was obtained by separating from the mold. The refractive index of the ultraviolet-curable resin measured by an ellipsometer was 1.53. The refractive index of the triacetyl cellulose film was 1.49. The finely surface-treated film was 60 mm wide and 45 mm long. The film had slopes formed continuously in a direction of the width thereof and in parallel with one another. The pitch between adjacent slopes was 210 μm. Flat surfaces were provided between the slopes. The slopes and the flat surfaces formed triangles in section. The width of each of the slopes was in a range of from 10 to 16 μm. The angle of each of the slopes was in a range of from 42.5 to 43 degrees. The angle of each of the flat surfaces was in a range of from 1.8 to 3.5 degrees. The angle change between adjacent flat surfaces was not larger than 0.1 degree. The area of the flat surfaces was not smaller than 12 times as large as that of the slopes.

On the other hand, a reflection plate was stuck to a lower substrate surface of a twisted nematic liquid-crystal cell and a polarizer was stuck to an upper substrate surface of the liquid-crystal cell to thereby produce a normally white reflection type liquid-crystal panel. On this occasion, an end portion of the upper substrate was protruded more than a corresponding end surface of the lower substrate. Then, a cold-cathode tube was disposed as an illumination light source on a side surface of the liquid-crystal panel. The cold-cathode tube was covered with a reflection film having a silver thin film formed in its surface. The reflection film was stuck to upper and lower positions of the end portion of the upper substrate of the liquid-crystal panel so that light was prevented from leaking.

The ultraviolet-curable resin film was stuck to the upper polarizer surface of the reflection type liquid-crystal panel through a transparent adhesive agent with a refractive index of 1.51 so that the direction of the length of the slopes formed in the film was parallel with the end surface on which the cold-cathode tube was disposed, and so that the slopes faced the end surface on which the cold-cathode tube was disposed. In addition, a white PET film (reflectance: 98%) was stuck, through a transparent adhesive agent, to other three end surfaces of the upper substrate except the end surface on which the cold-cathode tube was disposed. Thus, a reflection type liquid-crystal display apparatus according to the invention was obtained.

EXAMPLE 2

A metal flat plate was bent at three points to thereby produce a frame in which the reflection type liquid-crystal panel obtained in Example 1 could be inserted and fixed. The same white PET film as that used in Example 1 was stuck, through a transparent adhesive agent, to positions of the metal plate corresponding to the three end surfaces of the liquid-crystal panel where the illumination lamp was not provided. Then, a liquid-crystal display apparatus was inserted and fixed in the frame. Thus, a reflection type liquid-crystal display apparatus according to the invention was obtained.

EXAMPLE 3

A tin-plated steel plate was bent at three points in the same manner as in Example 2. A reflection type liquid-crystal panel obtained in Example 1 was inserted and fixed in the plate. Thus, a reflection type liquid-crystal display apparatus according to the invention was obtained.

COMPARATIVE EXAMPLE 1

A reflection type liquid-crystal panel was produced in the same manner as in Example 1. A reflection type liquid-crystal display apparatus having no light-reflecting mechanism in end surfaces of the panel was provided as Comparative Example 1.

COMPARATIVE EXAMPLE 2

A steel plate was bent at three points. A reflection type liquid-crystal panel obtained in Example 1 was inserted and fixed in the plate. Thus, a reflection type liquid-crystal display apparatus was obtained as Comparative Example 2.

The reflection type liquid-crystal apparatus was observed while the cold-cathode tube was switched on in the condition that the liquid-crystal cell was supplied with no voltage. As a result, in any case of Examples 1 and 2 and Compative Examples, an illuminating effect in a dark place was obtained compared with the case where the cold-cathode tube was switched off. In Compative Examples, however, side end surfaces of the liquid-crystal panel looked very bright compared with Examples 1 and 2. It was found that incident light was leaked in Compative Examples.

Further, luminance in the center of the reflection type liquid-crystal display apparatus was measured by a luminance meter BM-7 made by TOPCON Corp. As a result, Examples 1 and 2 exhibited luminance of 28 cd/m$^2$ and Example 3 exhibited luminance of 26 cd/m$^2$ whereas Compative Examples 1 and 2 exhibited luminance of 22 cd/m$^2$. A luminance-improving effect was obtained in Examples.

In addition, display was observed in the condition that electric field was applied to the reflection type liquid-crystal display apparatus. In any case of Examples 1, 2 and 3 and Compative Examples, disorder of an image, or the like, was not observed and there was no particular problem.

As described above, in accordance with the invention, a reflection type liquid-crystal display apparatus having a high illuminating effect can be achieved by the provision of a light-reflecting structure on side end surfaces of a liquid-crystal panel fulfilling a light guide function. Hence, the invention has a large industrial value.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A reflection type liquid-crystal display apparatus comprising:
    a light source; and
    a liquid-crystal display device including a lower substrate provided with a reflection plate, an upper substrate provided with a transparent film on which a light-reflecting element is provided for reflecting transmitted light toward the lower substrate side, and liquid crystal held between said lower substrate and said upper substrate, said light source being disposed at an end surface of said upper substrate, said liquid-crystal display device being configured so that light incident onto a surface of said upper substrate opposite to a contact surface of said upper substrate with said liquid crystal is reflected by said reflection plate of said lower substrate so as to exit from said surface of said upper substrate opposite to said contact surface of said upper substrate with said liquid crystal,
    wherein at least one of end surfaces of said upper substrate except the end surface on which said light source is disposed is coated with a reflection layer, and
    wherein an end portion of said upper substrate is protruded more than a corresponding end portion of said lower substrate so that said light source is disposed on said protruded end surface of said upper substrate.

2. A reflection type liquid-crystal display apparatus according to claim 1, wherein said reflection layer is constituted by a selected one of a reflection film, a reflection sheet and a reflection plate stuck onto said end surface.

3. A reflection type liquid-crystal display apparatus according to claim 1, wherein said reflection layer is provided on an inner surface of a frame so that at least one end surface of said liquid-crystal display device is disposed closely on said frame.

4. A reflection type liquid-crystal display apparatus according to claim 3, wherein a selected one of a reflection film, a reflection sheet and a reflection plate is stuck onto said inner surface of said frame.

5. A reflection type liquid-crystal display apparatus according to claim 3, wherein said inner surface of said frame is made of a metal plate having a light-reflecting function.

6. A reflection type liquid-crystal display apparatus according to claim 1, wherein a polarizer is disposed on said surface of said upper substrate opposite to said contact surface of said upper substrate with said liquid crystal.

7. A reflection type liquid-crystal display apparatus according to claim 6, wherein an end portion of said polarizer is protruded more than a corresponding end portion of said lower substrate so that said light source is disposed on said protruded end surfaces of said upper substrate and said polarizer.

8. The apparatus of claim 1, further wherein said corresponding end portion of said lower substrate includes a sealing material, such that said corresponding end portion of said lower substrate and said sealing material both protrude less than said at least one end surface of said upper substrate.

* * * * *